United States Patent [19]

Wenzel et al.

[11] 4,045,421

[45] Aug. 30, 1977

[54] LIGNIN DISPERSANT

[75] Inventors: Donald E. Wenzel; Vincent F. Felicetta, both of Bellingham, Wash.

[73] Assignee: Georgia-Pacific Corporation, Portland, Oreg.

[21] Appl. No.: 713,295

[22] Filed: Aug. 10, 1976

[51] Int. Cl.² .................................................. C07C 1/00
[52] U.S. Cl. .......................... 260/124 R; 260/124 A; 106/307; 106/308 Q
[58] Field of Search ............ 260/124 R, 124 A, 124 B

[56] References Cited

FOREIGN PATENT DOCUMENTS 48,621  11/1918  Sweden .......................... 260/124 R

OTHER PUBLICATIONS

Brauns, et al., "The Chemistry of Supplement Volume". pp. 552-554, A.B.I.P.C. vol. 37, No. 10, vol. 7313.

Primary Examiner—Delbert R. Phillips
Attorney, Agent, or Firm—Peter P. Chevis

[57] ABSTRACT

A process for the preparation and recovery of an effective dispersant from vanillin raffinate by reaction with formaldehyde is described.

8 Claims, No Drawings

LIGNIN DISPERSANT

This invention pertains to a lignin dispersant; and more particularly to a lignin dispersant prepared and recovered from a vanillin raffinate.

One of the common processes for the preparation of vanillin comprises the alkaline oxidation of lignin. Numerous patents have issued covering processes for alkaline oxidation of lignin for vanillin preparation, many of which are disclosed in texts such as "Lignins: Occurrence, Formation, Structure and Reactions" edited by K. V. Sarkanen and C. H. Ludwig, published by John Wiley & Sons, Inc. (1971); and in Kirk-Othmer's "Encyclopedia of Chemical Technology", Vol. 21, published by John Wiley & Sons, Inc. (1970).

Generally, the lignin is subjected to partial oxidation under alkaline conditions, often in the presence of a metallic catalyst, to produce the vanillin. After removal of the vanillin and other monomeric oxidation products, a major portion, from about 80 to 90 percent, of the original lignin or spent liquor is obtained as a vanillin raffinate. The raffinate contains lignins which have been fragmented to low molecular weight and other organic constituents. In addition to the organic constituents, inorganic salts such as sodium sulfate, sodium carbonate and others, may be present in an amount near to that of the organic content.

A common method used for separation of the major portion of the higher molecular weight lignin fractions from the raffinate is by acid precipitation as disclosed by U.S. Patent No. 3,054,825 which involves acidifying the raffinate with, for example, sulfuric acid to precipitate the lignin. The process has to be carried out under very closely controlled conditions in order to obtain a filterable material or a product which may be recovered from the raffinate. If the conditions are not closely controlled, the lignin may precipitate as a colloidal dispersion or come down in a slimy, coagulated mass making it difficult to remove or process further. These difficulties are somewhat similar to those experienced in acid precipitation of alkali lignin as disclosed in U.S. Pat. No. 3,546,200 where a halohydrocarbon is used; U.S. Pat. Nos. 3,048,576 and 2,997,466 where superatmospheric conditions are employed; U.S. Pat. No. 2,813,090 where freezing is used; and others. In addition, the crystallization of large amounts of the inorganic salt with the lignin fractions must be avoided. The lignin fraction recovered is effective for most of the utilities for which lignin is used and is especially effective as a dispersant.

It is therefore an object of this invention to provide for an improved process for the recovery of the lignin fractions from vanillin raffinate. A further object is to provide a process for the recovery of the lignin fractions characterized by improved yield. A still further object is to provide a process for the recovery of lignin from vanillin raffinate in a form effective as a dispersant. Another object is to provide an effective dispersant and a process for the preparation and recovery of the dispersant from vanillin raffinate.

The above and other objects are attained by reacting an aqueous raffinate solution containing from 15 to 30 weight percent solids with from 2 to 10 weight percent of formaldehyde at a temperature in the range of 60° to 120° C and a pH in the range of 8 to 11, preferably 9 to 10. The reaction is carried out until a substantial portion of the formaldehyde is reacted with the lignin and subsequently the reaction mixture is acidified with an inorganic acid to a pH below 2.5 to precipitate the lignin which is then coagulated by heating to a temperature in the range of 70° to 95° C. The acidified mixture after coagulation is cooled to a temperature below 50° C and the precipitated and coagulted lignin separated from the mixture. By the above process, an increase in yield is obtained and the resulting precipitate may be coagulated at higher temperatures and more easily separated from the mixture than when the raffinate is not pretreated. The formaldehyde pretreatment does not materially affect the dispersing properties of the lignin recovered from the raffinate and the product may be interchangeably used with the raffinate lignin recovered without pretreatment.

The reaction of the formaldehyde with the vanillin raffinate may be simply carried out by adding the formaldehyde to the raffinate and heating the mixture at a temperature in the range of 60° to 120° C at a pH in the range of 8 to 11 until a major portion of the formaldehyde has reacted. An increase in molecular weight in the precipitated and coagulated lignin is obtained by the formaldehyde treatment indicating that the formaldehyde may act as a cross-linking agent to cross-link some of the lignin molecules with each other and possibly with other organic constituents in the raffinate. The amount of formaldehyde added to the raffinate is generally in the range of 2 to 10 percent, preferably 4 to 6 weight percent, based upon the solids content of the raffinate solution. Generally, with 2 percent formaldehyde, the properties of the lignin fragments are sufficiently modified to aid in their precipitation and coagulation. Apparently, only a limited amount of formaldehyde will react with the raffinate under the above conditions so that the use of larger amounts of formaldehyde over 10% are of no particular advantage. Small amounts of formaldehyde react rapidly with the raffinate solution so that at the low ranges of formaldehyde usage, substantially all of the formaldehyde may react within the time required to add and mix the formaldehyde with the raffinate solution. However, generally the formaldehyde and the raffinate mixture are reacted for from 1 to 24 hours at a temperature of 60° to 120° C, preferably in the range of 80° to 95° C for a reaction time of 4 to 12 hours. When the amount of formaldehyde used is in the upper range of the formaldehyde usage, the reaction may be initiated at a lower temperature and then heated to the higher temperature after a portion of the formaldehyde has reacted.

Generally, the raffinate solution reacted with the formaldehyde and from which the lignin is precipitated contains about 15 to 30 weight percent of solids. While the concentration of the raffinate available from the vanillin process may vary somewhat depending upon the process and detail operating conditions of the particular process, usually the concentration is in the range of 18 to 25 percent and thus may be used as obtained without concentration or dilution. While at concentrations above 30 weight percent solids higher rates of reaction with formaldehyde may be obtained, concentrations above 30% are seldom used. Generally, the solution reacted with the formaldehyde is at a concentration which is desirable for the subsequent step of precipitation and coagulation of the lignin.

After reaction of the vanillin raffinate solution with the formaldehyde, the reaction mixture may be acidified to a pH below 2.5 by addition of an inorganic acid such as for example sulfuric acid, hydrochloric, phosphoric, and others. The vanillin raffinate as obtained from the vanillin process is generally alkaline and may be at a pH of 10 to 12 when obtained. Thus, small amounts of acid may be added prior to the formaldehyde reaction to bring the pH in the range of 8 to 11. Preferably, the formaldehyde reaction with the raffinate is carried out at a pH of 9 to 10 so that a significant amount of acidification is required to lower the pH to below 2.5, preferably in the range of 1.5 to 2. The acidification may be carried out at ambient temperature or any temperature not exceeding the low range of the coagulatin temperature. After the addition of the acid, the mixture is heated to a temperature in the range of 70° to 95° C to coagulate the precipitate. The coagulation temperature is critical to obtain a product which may be relatively easily recovered. If the temperature is not high enough, proper coagulation will not be obtained so that the lignin will be present in a colloidal slimy state. As a rule, higher temperatures result in a product more easily recovered. However, if the temperature is too high, the precipitated lignin coagulates into one mass which cannot be separated or washed by standard methods. The coagulation temperature preferably is in the range of 80° to 90° C in which event the lignin or precipitate is coagulated into individual relatively small particles and thus may be recovered without too much difficulty by filtration, centrifugation, settling, or by use of other methods.

After coagulation, it is generally desirable to cool the mixture to a temperature of 50° C or lower prior to filtration or separation of the precipitate from the mixture. Higher yields are obtained at lower temperatures and generally the precipitate is more easily handled at the lower temperatures. However if the temperature is too low, an appreciable amount of inorganics may crystallize out which would require further processing to remove these salts. Generally, temperatures in the range of 30° to 40° C may be used with most raffinate solutions without crystallization of the inorganics. For solutions which contain low concentration of inorganic salts, temperatures of 20° C or lower may be employed.

The following example further illustrates the invention.

A vanillin raffinate was obtained from a process where a fermented calcium-base spent sulfite liquor was oxidized under alkaline conditions in presence of a metal catalyst. The vanillin was recovered by solvent extraction and the raffinate obtained contained about 22-½ percent solids. The raffinate was adjusted to pH 10 by addition of a small amount of sulfuric acid. To this solution, 5% formaldehyde, based upon the solids content of the raffinate solution, was added as a 50% solution and the mixture was reacted for 16 hours in a 95° C water bath. After reaction with formaldehyde, the solution was cooled and acidified to a pH of about 2 by addition of sulfuric acid. The resulting slurry was then mixed and heated to a temperature in the range of 85° to 90° C to coagulate the precipitate. The mixture was cooled to 35° C, filtered, and washed with a small amount of water. The yield of the precipitate obtained represents 20.4% of the raffinate solids. An analysis of the recovered lignin indicated that the product had a methoxyl content of 10.6% and a weight average molecular weight of about 9000 as estimated from diffusion into agar gel as described in J. Am. Chem. Soc., Vol. 81, 2054 (1959) by J. Moacanin et al.

The product obtained was tested as a carbon black dispersant. In the test, 10 grams of carbon black beads were mixed with 15.5 milliliters of 0.3% caustic solution, and the dispersant as a 10% solution was added in 0.01 ml increments to the above mixture and agitated in a wrist-type paint shaker mixer in a container containing stainless steel balls. After each addition of the dispersant, the mixture is mixed about 30 seconds and the suspension checked to see whether it is sufficiently fluid to pour from the mixing container on tipping. It was found that after addition of 1.42 milliliters on the 10% solution of the product, the suspension became sufficiently fluid to pour from the container. A standard lignosulfonate carbon black dispersant when tested in the manner similar to that described above, required 1.37 milliliters to obtain the required fluidity.

To compare the results above with the product obtained without the formaldehyde treatment, the raffinate solution used above was acidified to a pH of about 2 at room temperature with sulfuric acid and the mixture heated to about 61° C to coagulate the precipitate. The coagulation temperature was in the high temperature range that could be used without the precipitate coming down in one mass. The mixture was cooled to 35° C and filtered. The product filtered with difficulty and after wshing, a yield of 14.6% of the raffinate solids was obtained. This product had a methoxyl content of 12.1% and when tested as a carbon black dispersant in a manner similar to that above, required 1.43 milliliters to obtain the required fluidity.

What is claimed is:

1. A process for the preparation of a dispersant from an aqueous vanillin raffinate obtained upon partial oxidation of lignin, which comprises adding to the aqueous raffinate solution containing from 15 to 30 weight percent solids from 2 to 10 weight percent of formaldehyde, based upon raffinate solids, heating the mixture at a pH in the range of 8 to 11 at a temperature in the range of 60° to 120° C until a substantial portion of the formaldehyde has reacted with the lignin, subsequently acidifying the mixture at a temperature in the range of 70° to 95° C with an inorganic acid to a pH below 2.5 to precipitate and coagulate the lignin, cooling the acidified mixture after coagulation of the precipitate to a temperature below 50° C and separating the precipitated and coagulated lignin from the mixture.

2. A process according to claim 1 wherein the reacted formaldehyde-lignin mixture is acidified to a pH in the range of 1.5 to 2, the precipitate coagulated at a temperature in the range of 80° to 90° C, and the acidified mixture cooled to 30° to 40° C after coagulation.

3. A process according to claim 1 wherein the formaldehyde is added to the raffinate solution in an amount of from 4 to 6 weight percent of the vanillin raffinate solids.

4. A process according to claim 3 wherein the formaldehyde and raffinate mixture are heated at a pH in the range of 9 to 10 at a temperature of 80° to 95° C for a reaction time in the range of from 4 to 12 hours.

5. A process according to claim 4 wherein the reacted formaldehyde-lignin mixture is acidified to a pH in the range of 1.5 to 2, the precipitate coagulated at a temperature in the range of 80° to 90° C, and the acidified mixture after coagulation is cooled to a temperature in the range of 30° to 40° C.

6. A composition obtained by the process of claim 1.
7. A composition obtained by the process of claim 2.
8. A composition obtained by the process of claim 5.

* * * * *